Patented Mar. 11, 1952

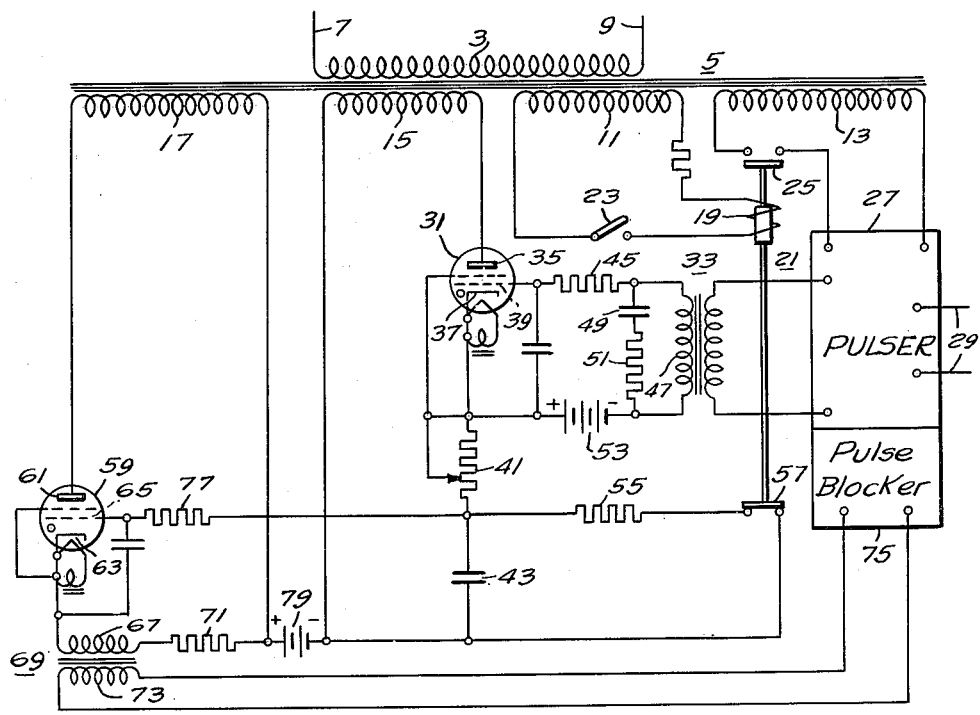

2,588,523

UNITED STATES PATENT OFFICE 2,588,523

CONTROL APPARATUS

Edward C. Hartwig and William E. Large, Tonawanda, N. Y., assignors to Westinghouse Electric Corporation, East Pittsburgh, Pa., a corporation of Pennsylvania Application August 22, 1946, Serial No. 692,401

9 Claims. (Cl. 315—275)

This invention relates to control apparatus, and it has particular relation to control apparatus employing an electronic valve.

In connection with certain equipment, for example resistance pulsation welding equipment, it is frequently desirable to provide control apparatus including an originally non-conductive electric valve in an alternating voltage circuit which valve is rendered conductive in each positive half-period of the alternating voltage in response to and after a certain event has occurred a selected number of times, a positive half-period being one in which the anode of the valve is positive with respect to the cathode. The valve is effective when conductive in each positive half-period to prevent further occurrences of the event.

In such control apparatus constructed in accordance with the teachings of the prior art, a capacitor is provided in the control circuit of the valve and is effective to cause the valve to become conductive in a positive half-period only when the capacitor has a predetermined charge. The capacitor is originally in a discharged condition but following initiation of the operation of the circuit, the capacitor receives an increment of charge each time the event occurs. After the event has occurred a selected number of times, the capacitor is sufficiently charged so the valve is rendered conductive in a positive half-period.

This prior apparatus as described is not entirely satisfactory for it is sometimes erratic in operation. While the valve may be rendered conductive in a positive half-period after the event has occurred a selected number of times, the valve may fail to become conductive a few half-periods later. Now in many cases such failure is fatal as the continued operation of the valve is necessary to the operation of the complete equipment.

It is, accordingly, an object of our invention to provide a new and improved apparatus for counting a selected number of occurrences of a repeated event.

A further object of our invention is to provide a novel control apparatus including an electric valve in an alternating current circuit to be rendered conductive in each positive half-period of the alternating current following the occurrence of a given event.

Another object of our invention is to provide a novel control apparatus embodying an electric valve in an alternating current circuit which valve is rendered conductive in a positive half-period immediately following the occurrences of a given event and in each positive half-period thereafter, the apparatus being inexpensive to manufacture and rugged in construction.

Our invention arises from the realization that the erratic operation of the prior apparatus is the result of the leakage of a portion of the charge from the capacitor after the valve is first rendered conductive. Thus, the capacitor is gradually charged in response to repeated occurrences of the event to the value necessary to render the valve conductive; but, as soon as the valve becomes conductive, further charging of the capacitor is prevented since further occurrences of the event are prevented thereby. Consequently, when a portion of the charge on the capacitor leaks off, the charge on the capacitor may decrease below the value necessary to render the valve conductive in a positive half-period. In accordance with our invention, this effect is avoided by providing an additional charge for the capacitor, independent of the main charging circuit, when the valve becomes conductive.

The features of our invention which we consider novel are set forth with greater particularity in the accompanying claims. The invention itself, however, together with additional objects and advantages thereof, may be better understood from the following description of a specific embodiment of our invention, when read in connection with the accompanying drawing, in which the single figure is a schematic circuit diagram of a preferred embodiment.

As shown in the drawing, the primary winding 3 of a supply transformer 5 is energized from a pair of alternating voltage supply lines 7 and 9. Four secondary windings 11, 13, 15 and 17 are provided on the transformer 5. The operating coil 19 of a relay 21 is in circuit with an initiating switch 23 across one of the secondary windings 11. A first contact 25 on the relay 21 is arranged upon energization of the relay 21 to complete a circuit from the second secondary winding 13 through a pulser 27 adapted to supply discrete current impulses to a load through leads 29. The voltage pulser 27 is here represented by a block and may be any of a number of well-known suitable devices of this type, or may be the one illustrated and described in the copending application of C. B. Stadum and W. E. Large, Serial No. 724,622, filed on January 27, 1949, now Patent No. 2,492,015, and assigned to the Westinghouse Electric Corporation.

Each time the pulser 27 supplies a current pulse to the load, it also supplies a single voltage pulse of less than a period duration in the control circuit of a first electric valve 31 through an auxiliary transformer 33. The electric valve 31 is preferably of the arc-like type, such as a thyratron, and is provided with an anode 35, a cathode 37, and a control electrode 39. The anode 35 of the first valve 31 is connected to one terminal of the third secondary winding 15 of the supply transformer 5. The cathode 37 of the first valve 31 is connected through an adjustable resistor 41 and a capacitor 43 to the other terminal of the secondary winding 15. The first valve 31 has such characteristics that it becomes conductive in positive half-periods of its anode to cathode voltage, only when the control electrode to cathode voltage is more positive than a predetermined critical value.

The control circuit for the first valve 31, which determines the control electrode to cathode voltage, extends from the control electrode 39 through a grid resistor 45 to a parallel circuit comprising the secondary winding 47 of the auxiliary transformer 33 on one side, and a series-connected capacitor 49 and resistor 51 on the other side. The control circuit continues from the parallel circuit through a source of biasing voltage, illustrated as a battery 53, to the cathode 37. The biasing voltage is of a polarity tending to maintain the first valve 31 non-conductive. However, as each current pulse is supplied to the load, the voltage pulse provided through the auxiliary transformer 33 counteracts the biasing voltage, and renders the first valve 31 conductive. Each time the first valve 31 becomes conductive, current flows therethrough to charge the timing capacitor 43, the rate of charge being determined by the setting of the adjustable resistor 41. It thus appears that the capacitor 43 is charged gradually, receiving an increment of charge each time a current pulse is supplied to the load.

A discharge circuit is provided for the capacitor 43 which extends through a resistor 55 and the originally closed second contact 57 of the relay 21. However, during operation of the apparatus, the relay 21 is energized and the second contact 57 remains open.

The capacitor 43 is also included in the control circuit of a second valve 59. This second valve 59 is preferably of the arc-like type, such as a thyratron, and has an anode 61, a cathode 63, and a control electrode 65. The anode 61 of the second valve 59 is connected to one terminal of the fourth secondary winding 17 of the supply transformer 5. The cathode 63 is connected to the other terminal of this secondary winding 17 through impedance means which comprises the primary winding 67 of a second auxiliary transformer 69 and a resistor 71.

The secondary winding 73 of the auxiliary transformer 69 is connected to energize a suitable pulse blocker 75 associated with the pulser 27 which is effective to prevent a supply of current pulses to the load, and, therefore to prevent the supply of a voltage pulse through the auxiliary transformer 33, so long as the second valve 59 becomes conductive in each positive half-period of its anode to cathode voltage. In other words, the pulse blocker 75 is effective so long as the second valve 59 is conductive in each positive half-period to prevent further operation of the pulser 27. A suitable blocker of this type is also shown in the aforesaid application of Stadum and Large.

It is to be noted that the anodes of the first and second valves 31 and 59 are connected to electrically opposite terminals of their respective secondary windings 15 and 17. Consequently, the positive half-periods of the first and second valves 31 and 59 are actually opposite half-periods of the supply voltage.

The control circuit of the second valve 59 extends from the control electrode 65 thereof through a grid resistor 77, the capacitor 43, a source of biasing voltage illustrated as a battery 79, the resistor 71 and the primary winding 67 of the second auxiliary transformer 69, to the cathode 63. The second valve 59 has such characteristics that it is rendered conductive in a positive half-period only when the control electrode to cathode voltage is more positive than a predetermined critical value. The polarity of the biasing voltage is such that it tends to maintain the control electrode to cathode voltage much less positive than the critical value, and so tends to maintain the second valve 59 non-conductive. However, the charge developed on the capacitor 43 is in opposition to the biasing voltage so that, when the capacitor 43 attains a predetermined charge, the control electrode to cathode voltage of the second valve 59 becomes more positive than the critical voltage to render the second valve 59 conductive.

When the second valve 59 becomes conductive, current flows therethrough and through the primary winding 67 of the second auxiliary transformer 69 to halt the operation of the pulser 27. However, the impedance means comprising the primary winding 67 and the resistor 71 is also a part of the control circuit of the second valve 59. Current through this impedance means when the second valve 59 is conductive, develops a voltage thereacross of such magnitude and polarity as to cause the control electrode 65 to become highly negative with respect to the cathode 63, even though the capacitor 43 is charged above the value necessary to render the second valve conductive. When the control electrode 65 becomes highly negative, it attracts positive ions, and the anode 61 and control electrode 65 of the valve 69 function in a manner similar to a cold cathode diode so that current flows from the secondary winding 17 of the supply transformer 5 through the anode 61, control electrode 65, capacitor 43 and biasing voltage source 79 to provide an additional charge of the same polarity on the capacitor 43. This additional charge is provided only while the second valve 59 is conductive as the voltage across the impedance means substantially disappears when the second valve 59 is non-conductive. The additional charge thus provided on the capacitor 43 is of sufficient magnitude as to more than make up for any leakage which might occur. Consequently, the second valve 59 is definitely rendered conductive in each positive half-period.

Although we have shown and described a specific embodiment of our invention, we are aware that many modifications thereof may be made without departing from the spirit of the invention. It is also to be noted that the disclosed arrangement may be used with many arrangements other than welding apparatus, and may be satisfactorily employed whether the original charge on the capacitor is supplied in steps as in a counting arrangement or over a continuous interval as in a timing arrangement. For these reasons, we do not intend to limit our invention to the specific arrangement described.

We claim as our invention:

1. Control apparatus comprising means adapted to function as an alternating voltage source, an electric valve of the arc-like type in a main circuit across said source, a control circuit for said valve effective to render it conductive in each positive half-period of said source voltage in which the total voltage in said control circuit is more positive than a predetermined critical value, said control circuit including a capacitor and normally having a total voltage less positive than said critical value whereby said valve is maintained non-conductive, a charging circuit operable only while said valve is maintained non-conductive for gradually charging said capacitor with a polarity such that the total voltage in said control circuit becomes more positive than said critical value when the capacitor attains a predetermined charge, and means in said main circuit effective when said valve becomes conductive to cause said capacitor to receive an additional charge of the same polarity independently of said charging means.

2. Control apparatus comprising means adapted to function as an alternating voltage source, an electric valve of the arc-like type in a main circuit across said source, a control circuit for said valve effective to render it conductive in each positive half-period of said source voltage in which the total voltage in said control circuit is more positive than a predetermined critical value, said control circuit including a capacitor and normally having a total voltage less positive than said critical value whereby said valve is maintained non-conductive, charging means operable only while said valve is maintained non-conductive for gradually charging said capacitor with a polarity such that the total voltage in said control circuit becomes more positive than said critical value when the capacitor attains a predetermined charge, and connections in said main circuit effective when said valve becomes conductive to cause the completion of a unidirectional current circuit across said source through said capacitor to supply an additional charge of the same polarity to said capacitor.

3. Control apparatus comprising means adapted to function as an alternating voltage source, an electric valve of the arc-like type having an anode and a cathode in a main circuit across said source, said valve also having a control electrode and becoming conductive in a positive half-period of said alternating voltage only when the voltage between said control electrode and cathode is more positive than a predetermined critical value, a control circuit including a capacitor and terminals for impressing a biasing voltage from said control electrode to a point on said main circuit between said cathode and source, said biasing voltage tending to cause said control electrode to cathode voltage to be less positive than said critical value, a charging circuit operable only while said valve is non-conductive to gradually charge the capacitor with a polarity opposite to that of said biasing voltage whereby the control electrode to cathode voltage becomes more positive than said critical value when said capacitor attains a predetermined charge, and connections in said main circuit effective in a positive half period in which said valve becomes conductive to cause said control electrode to be highly negative relative to said anode whereby current flows from said source through said anode, control electrode and capacitor to charge the capacitor further with the same polarity.

4. Control apparatus comprising means adapted to function as a source of alternating voltage, an electric valve of the arc-like type having an anode, a cathode and a control electrode, circuit means connecting said anode to one terminal of said source, an impedance connected between said cathode and the other terminal of said source, said valve becoming conductive in positive half-periods of said alternating voltage only when the control electrode to cathode voltage is more positive than a predetermined critical value, a capacitor, connections for impressing a biasing voltage in circuit with said capacitor between said control electrode and a point intermediate said impedance and said other terminal whereby the control electrode to cathode voltage is less positive than said critical value, and a charging circuit operable only while said valve is non-conductive to charge said capacitor gradually in opposition to said biasing voltage whereby the control electrode to cathode voltage becomes more positive than said critical value when said capacitor attains a predetermined charge, the voltage developed across said impedance being effective when said valve is conductive to cause said control electrode to be highly negative relative to said anode whereby current flows from said source through said anode, control electrode and capacitor to charge the capacitor further with the same polarity.

5. In combination, an electric valve having an anode, a cathode, and a control electrode, a capacitor connected to said control electrode to initiate conduction in said valve, a charging circuit for said capacitor and a second charging circuit in series with said capacitor through a circuit including the anode and control electrode of said valve.

6. In combination, an electric valve having an anode, a cathode and a control electrode, a capacitor connected to said control electrode to initiate conduction in said valve, a charging circuit for said capacitor and a second charging circuit in series with said capacitor through said valve.

7. Control apparatus comprising means adapted to function as an alternating voltage source, an electric valve of the arc-like type having an anode and a cathode in a main circuit across said source, said valve also having a control electrode and becoming conductive in a positive half-period of said alternating voltage only when the voltage between said control electrode and cathode is more positive than a predetermined critical value, a control circuit including a capacitor and terminals for impressing a biasing voltage extending from said control electrode to a point on said main circuit between said cathode and source, said biasing voltage tending to cause said control electrode to cathode voltage to be less positive than said critical value, a charging circuit operable to gradually charge the capacitor with a polarity opposite to that of said biasing voltage whereby the control electrode to cathode voltage becomes more positive than said critical value when said capacitor attains a predetermined charge, and means in said main circuit effective to cause said control electrode to be highly negative relative to said anode whereby current flows from said source through said anode, control electrode and capacitor to charge the capacitor further with the same polarity.

8. In combination, an electric discharge device having an anode, a cathode and a control electrode; load means connected between said anode and cathode and including potential absorbing means connected at one terminal to said cathode and at the other terminal to said anode; a capacitor connected between said control electrode and said other terminal and means for charging said capacitor.

9. In combination, an electric discharge device having an anode, a cathode, and a control electrode; a first and a second terminal for supplying a potential; load means capable of absorbing potential; means connecting said first terminal to said anode; means connecting said load means between said cathode and said second terminal; a capacitor; biasing means; means connecting said capacitor and said biasing means in series between said control electrode and the junction of said load means and said second terminal and means for charging said capacitor in such a sense as to counteract said biasing means.

EDWARD C. HARTWIG.
WILLIAM E. LARGE.

REFERENCES CITED

The following references are of record in the file of this patent:

UNITED STATES PATENTS

| Number | Name | Date |
| --- | --- | --- |
| 2,140,350 | Dawson | Dec. 13, 1938 |
| 2,259,289 | Blumentritt | Oct. 14, 1941 |
| 2,269,151 | Garman | Jan. 6, 1942 |
| 2,295,297 | Schneider | Sept. 8, 1942 |
| 2,331,242 | Smith | Oct. 5, 1943 |
| 2,337,871 | Cooper | Dec. 28, 1943 |
| 2,340,083 | Schnarz | Jan. 25, 1944 |
| 2,399,213 | Edwards | Apr. 30, 1946 |
| 2,405,095 | Mumma | July 30, 1946 |
| 2,409,583 | Perkins | Oct. 15, 1946 |
| 2,431,284 | Stadum | Nov. 18, 1947 |

FOREIGN PATENTS

| Number | Country | Date |
| --- | --- | --- |
| 265,523 | Great Britain | Feb. 7, 1927 |